Oct. 17, 1961   H. M. PETTEE   3,004,650
ARTICLE ORIENTING APPARATUS
Filed May 18, 1959   2 Sheets-Sheet 1
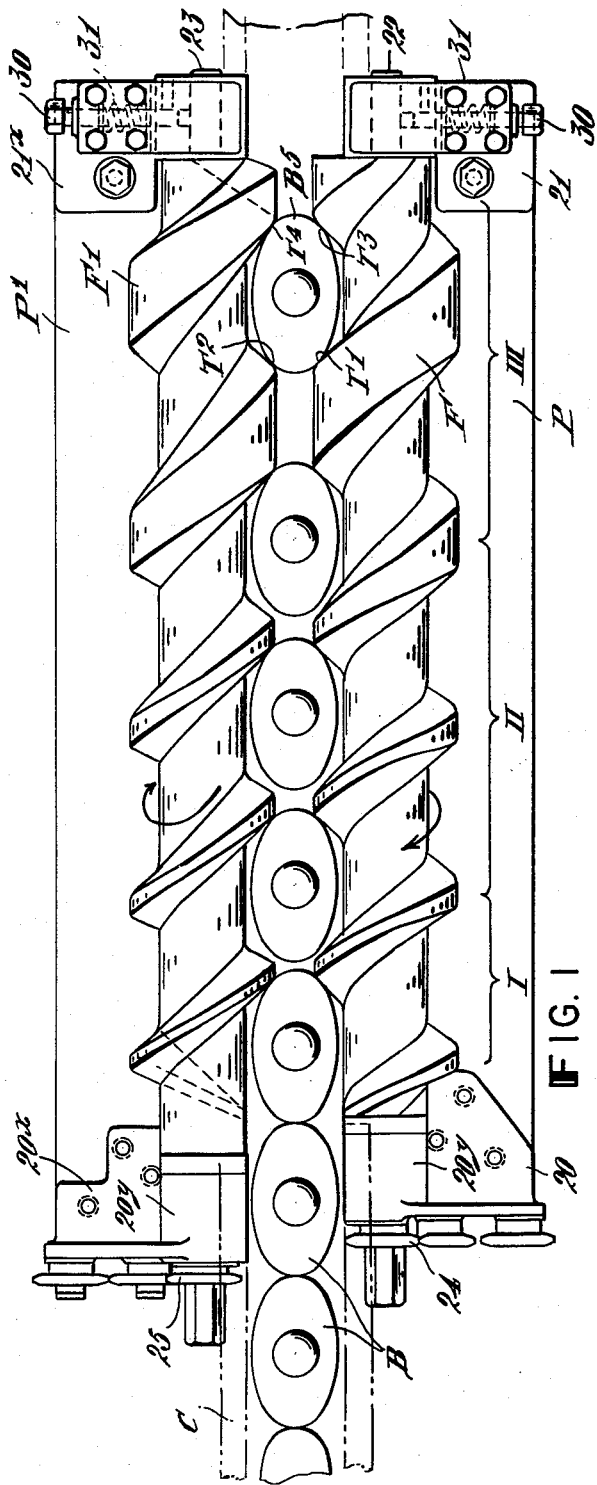
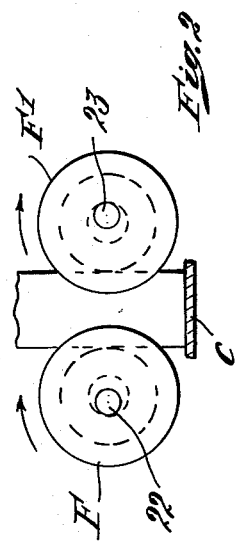
INVENTOR.
HERBERT M. PETTEE
BY
ATTORNEY.

Oct. 17, 1961 H. M. PETTEE 3,004,650
ARTICLE ORIENTING APPARATUS
Filed May 18, 1959 2 Sheets-Sheet 2

INVENTOR.
HERBERT M. PETTEE
BY
Roberts Cushman & Grover
ATTORNEY.

United States Patent Office 3,004,650
Patented Oct. 17, 1961

3,004,650
ARTICLE ORIENTING APPARATUS
Herbert M. Pettee, Holden, Mass., assignor to Geo. J. Meyer Manufacturing Co., Cudahy, Wis., a corporation of Wisconsin
Filed May 18, 1959, Ser. No. 813,896
2 Claims. (Cl. 198—33)

This invention pertains to labeling machines, for example, machines of the so-called "straight-a-way" type, wherein the articles to be labeled are advanced by conveyor means along a rectilinear path, and more especially to machines wherein the articles are advanced uninterruptedly rather than intermittently, as, for instance, a machine such as is disclosed in the co-pending application for Letters Patent filed by Sidney T. Carter on December 5, 1955, Serial No. 551,012, now Patent No. 2,940,630, but relates primarily to means for advancing the articles in properly spaced and oriented position into the field of action of the label-applying means. However, although the article advancing and spacing means of the present invention is primarily intended to supply articles to a labeling machine as above suggested, it is of broader utility and useful wherever it is desirable to advance articles, for instance containers, in properly spaced and timed relation, to a processing unit or the like.

In the application of labels to articles (especially to bottles), it is quite generally required that the label be applied to a particular area of the bottle surface. For instance, if the bottle be of generally elliptical shape in transverse section, it may be required that the label be applied to the central portion of one of the wider faces of the bottle; and in order that this may be accomplished with precision, it is necessary to "orient" the bottle, that is to say, to rotate it about its vertical axis either before it approaches the field of action of the label-applying means or while it is within the field of such action, so that the wide face of the bottle will be directly opposed to the means whereby the gummed label is advanced into contact with the bottle. One common prior practice has been to provide, in advance of the label-applying means, a so-called "spotting" mechanism having means for rotating the bottle through an arc of greater or lesser extent, and with provision for maintaining the bottle in this properly oriented relation while it is advanced through the label-applying zone. However, some, at least, of these prior spotting devices, while useful for orienting bottles which are moved intermittently by the conveyor means, have not been well adapted for orienting articles moving uninterruptedly, and particularly when the articles are being moved at high speed.

In the co-pending application of Sidney T. Carter, Serial No. 814,051, filed May 18, 1959, for Article Orienting Means for Labeling Machines, there is disclosed an arrangement whereby bottles of elliptical transverse section are oriented without interrupting their forward movement along the conveyor path by the use of two oppositely turning feed helices of opposite pitch, and with the bearings for the delivery end portions of the helices arranged to permit the helices to yield away from each other in opposition to spring pressure, and with the helices mounted eccentrically upon their shafts so that during one-half revolution the helices approach each other and during the other half revolution they recede from each other. In approaching each other the helices grip the bottle firmly between them, contacting the bottle at four spaced points, which are so arranged, relatively to the path of motion of the center of the bottle, that when thus gripped between the helices the major horizontal axis of the bottle is necessarily accurately aligned with the center of the conveyor path. Such an arrangement, as that just referred to, is very effective for the intended purpose and delivers the bottles, even though the latter may vary substantially in height or in transverse dimensions, in accurately oriented position into the field of action of a hold-down or head grip, which prevents the bottle from turning, after leaving the feed helices, as it continues along the conveyor path through the label-applying zone. However, when such oppositely rotating feed helices are employed, the points at which the two helices contact the bottle for gripping the latter, in orienting the bottle, are so relatively positioned as to develop a force which tends to tip the bottle forwardly, so that in order to prevent such forward tipping and to insure that the axis of the bottle will be vertical when it is engaged by the hold-down or head grip, it is necessary, in the apparatus above referred to, to provide means, for example something in the nature of a friction brake, which by contact with the upper portion of the bottle retards the forward motion of the upper part of the bottle slightly, so as to nullify any tendency for the bottle to tip forwardly.

The present invention constitutes an improvement over that of the above-noted co-pending application, having for its principal object the provision of an arrangement which accomplishes substantially the same result as that of the prior apparatus, but which, in its action, does not develop any tendency to tip the bottle forwardly or rearwardly as it advances toward the field of action of the hold-down device, thus making it unnecessary to apply retarding force to the upper part of the bottle and with resultant smoother action than that of the apparatus referred to.

A further object is to provide apparatus of the above type having simple and effective means to prevent any tendency of the bottle to tip sidewise as the bottle enters the field of action of the hold-down means.

The above objects are attained, in accordance with the present invention, by the use of feed screws of the same pitch and which are turned in the same direction and at the same angular velocity, the result being that the four points of contact of the feed helices with the bottle, while the latter is gripped between them, are so located that any tendency to tip the bottle either forwardly or rearwardly is nullified, thus making any retarding device unnecessary. Further, in order to prevent the bottle from tipping sidewise as it enters the field of action of the hold-down there is provided a rigid guide element, supported upon a stationary base, and which has a guiding edge parallel to the center of the conveyor path and so located as, by contact with the peripheral surface of the bottle neck, to steady the bottle and thus to prevent the bottle from tipping sidewise.

Other objects and advantages of the invention will be pointed out in the following more detailed description and by reference to the accompanying drawings wherein:

FIG. 1 is a more or less diagrammatic plan view, showing the feed helices of the present invention with a series of bottles of generally elliptical contour interposed between the feed helices and with the leading bottle of the series gripped between the opposed feed helices so that its major axis is accurately aligned with the conveyor path;

FIG. 2 is a diagrammatic end elevation, looking from the right-hand side of FIG. 1, with parts in vertical section and omitting parts, illustrating the arrangement of the two feed helices in eccentric relation to their respective shafts;

Figure 4:
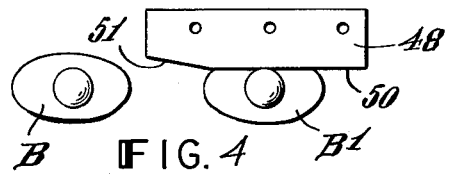
Figure 3:
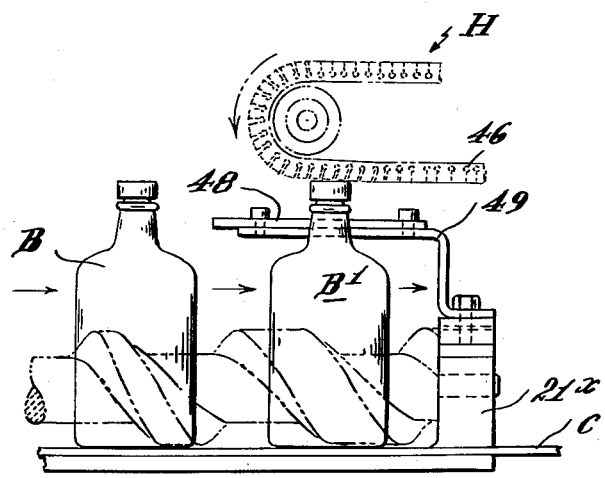
Figure 5:
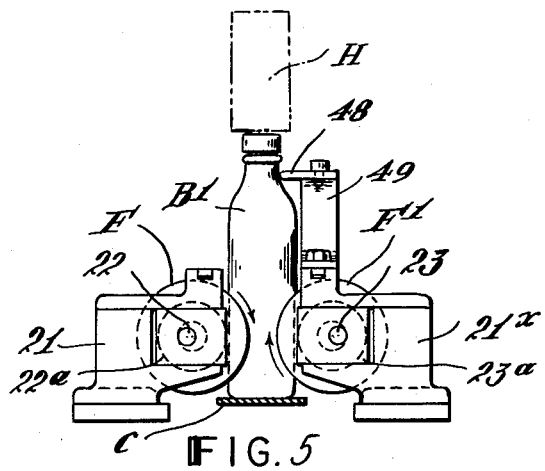

FIG. 3 is a fragmentary more or less diagrammatic side elevation (indicating the relative position of one of the feed helices in broken lines and the location of the receiving end of the hold-down device also in broken lines) illustrating the guide device of the present invention, whereby the bottles are restored to the vertical and/or held with their axes vertical as they enter the field of action of the hold-down device;

FIG. 4 is a fragmentary diagrammatic plan view showing the guide device of FIG. 3, with one bottle contacting the guide device and a second bottle approaching the guide device; and FIG. 5 is a diagrammatic end elevation, partly in vertical section and with relative location of the hold-down indicated in broken lines, looking from the right-hand side of FIG. 3.

The present invention may be embodied in a labeling machine of the general type disclosed in the co-pending application of Sidney T. Carter, Serial No. 551,012, filed December 5, 1955, for Labeling Machine. In accordance with the present invention, horizontal plates P and P' (FIG. 1), are arranged at opposite sides of the conveyor C by means of which the bottles B are moved uninterruptedly along a predetermined rectilinear path toward the field of action of label-applying mechanism (not shown). Desirably, the plates P and P' are so supported above the table of the machine that they may be moved toward or from each other to accommodate bottles of different sizes. The adjusting means may be of conventional type and constitutes no essential part of the present invention. Bearing brackets 20 and 20x mounted on the respective plates near their left-hand ends, as shown in FIG. 1, and corresponding bearing brackets 21 and 21x are arranged near the right-hand ends of the respective plates and these brackets support bearings for the parallel, helix-supporting shafts 22 and 23 (FIGS. 1, 2 and 5). These shafts carry the helices F and F¹ respectively. Preferably, these helices are tubular, with internal bores which receive the respective shafts with a close fit. Thus it becomes possible, if desired, to make each helix in several independent sections which is advantageous from a manufacturing standpoint. These helices are alike, being of the same pitch, each helix comprising an article-receiving portion (indicated in FIG. 1 by the bracket I) which is of constant pitch, the pitch being equal to or slightly in excess of the length of the major axis of the bottles B which are to be oriented, it being desirable to make the pitch slightly greater than the length of the major axis of a normal bottle so as to accommodate bottles which may be slightly oversized. Each helix also comprises a portion (indicated in FIG. 1 by the bracket II) which is of increasing pitch, such as to space successive bottles a desired distance apart for the proper application of the labels, and each helix also comprises a delivery portion (indicated by the bracket III) which is of a constant pitch, such as to advance the bottles at the same speed as that of the conveyor upon which the bottles are supported as they advance into the field of action of the labeling means.

The shafts 22 and 23 are driven at the same angular velocity and in the same direction by any suitable means, for example, such as that used for driving the parallel helices shown in the co-pending application of Sidney T. Carter, Serial No. 636,328, filed January 25, 1957, now Patent No. 2,890,787, for Apparatus for Arranging Like Articles in Uniformly Spaced Relation, but so modified as to turn the two helices in the same direction. However, any other appropriate drive means may be employed but such drive means must be capable of turning the shafts at such angular velocities that, at the delivery end portions of the helices, the linear velocity imparted to the bottle will equal that of the supporting conveyor. As here shown (FIG. 1), the drive means for the shafts comprises sprocket wheels 24 and 25 fixed to the left-hand ends of the respective shafts. Each of the bearing brackets 20 and 20x is provided with a cylindrical portion 21y, within which there is fitted a bushing (not shown) which is taper-reamed from each end toward its midportion so that the shaft which turns in this bushing is permitted to have a slight rocking motion about that part of the bushing which is of minimum diameter.

The opposite or right-hand ends of the shafts 22 and 23 turn in bearings carried by the brackets 21 and 21x respectively, these bearings being carried by blocks 22a and 23a (FIG. 5) mounted to slide horizontally and which are urged inwardly toward each other by springs 31, their inward motion being limited by bolts 30 (FIG. 1).

Each of the shafts 22 and 23, upon which the respective helices are mounted, as more fully illustrated in the above copending application of Sidney T. Carter, Serial No. 814,051, filed May 18, 1959, comprises a central cylindrical portion of a suitable diameter to receive its helix with a snug fit, and with portions of smaller diameter which are eccentric with reference to said central portion and which turn in the bearings at the opposite ends of the helix. Because of the tapered bushings in which the left-hand ends of the shafts turn and because of the horizontally slidable bearings for the right-hand ends of the shafts, the delivery ends of the helices have a horizontal component of motion in and out toward the conveyor path as the shaft rotates in by reason of the eccentricity of the end portions of the shaft. An eccentricity of the right-hand end of each shaft of the order of ⅛" has been found to give desirable results.

In setting up the apparatus, the helices, if tubular as above suggested, are first fitted onto the central portions of the respective shafts and the shafts are mounted in their bearings and then are turned manually until their right-hand ends are at their nearest points of approach and the helices are rotated on their shafts to the proper relative positions and are then pinned to the shafts.

The root diameter of each helix is the same throughout its length, but within the delivery portion of the helix, that is to say, within that portion designated by the bracket III (FIG. 1), the groove of the helix is so narrowed and of such shape that when the right-hand ends of the two shafts are at their nearest points of approach horizontally, a bottle B⁶, interposed between these portions of the helices, will be gripped tightly between the two helices, making a four point contact as indicated at T¹, T², T³ and T⁴ (FIG. 1). At all other portions of the helices the shape of the screw thread is such as to provide clearance between the bottle and the wall of the groove so that the bottle is free to turn slightly about its vertical axis.

While in FIG. 1 the four points of contact of the bottle with the two helices appear to be in the same plane, it will be appreciated that in the actual device, because the points of contact are on the surfaces of the helices, the diagonally opposite points T² and T³ are below the horizontal plane of the axis of the helix while the diagonally opposite points T⁴ and T¹ are above the axis of the helix, respectively. With this arrangement the forces exerted by the helices are so balanced that there is no tendency for the bottle to be tipped either forwardly or rearwardly as it moves along in response to the forward urge of the helices.

It will be noted by inspection of FIG. 1 that those bottles B which are to the left of the foremost bottle B¹ are not gripped firmly between the opposed helices. However, the shape of the helix groove in the delivery portion of each helix is such that the contact of the helices with the bottle, as the latter advances into the terminal portion III of the feed device, turns the bottle so as to dispose the major horizontal axis of the bottle in accurate alignment with the center line of the conveyor path, and while the bottle is still gripped in this position, it is contacted by the hold-down or head-grip device H (FIGS. 3 and 5). This device may, for example, be of the type more fully illustrated and described in the aforesaid application of Sidney T. Carter, Serial No. 551,012, filed December 5, 1955, for Labeling Machine. The hold-down device there disclosed comprises an endless belt which moves at the same linear velocity as the conveyor and whose lower run 46 (FIG. 3) is so positioned that it bears downwardly with resilient pressure against the tops of bottles as they advance toward the label-applying devices, thus maintaining the bottles in that position of orientation to which they have been adjusted by the action of the delivery portions of the helices. It is very desirable that the axis of the bottle be as nearly vertical as is practical when it is engaged by the hold-down device in order that the latter, by its downward pressure, may not tip the bottle and thus interfere with the proper application of the label. In order to straighten the bottle, if it be slightly tipped as it enters the field of action of the hold-down device and to maintain it in vertical position as the hold-down device comes into engagement with its top, there is provided, in accordance with the present invention, a normally fixed guide plate 48 (FIGS. 3, 4 and 5), here shown as supported on the horizontal arm 49 of a support, mounted on the bearing bracket 21x. This guide member 48 is provided with a horizontal edge 50 which is accurately parallel to the center line of the conveyor path and which is so spaced from the vertical plane of the center line of the conveyor path as to contact the neck portion of a bottle as the latter is being advanced by the opposed helices into the field of action of the hold-down device. Desirably, as shown in FIG. 4, this guide plate 50 is provided with a diagonal edge 51 converging toward the edge 50 and which is effective, by contact with the neck of a bottle which has tipped slightly to the left as it moves along the conveyor path, to restore the bottle to the vertical position as it arrives at the receiving end of the guide edge 50 of the plate 48. Obviously, provision may be made, although not here shown, whereby the plate 48 may be adjusted relatively to the supporting member 49 toward or from the conveyor path to accommodate bottles of different sizes. As illustrated, the guide plate 48 is located at the left-hand side of the conveyor path since, because, with helices of right-hand pitch, there is a slight tendency to tilt the bottle to the left, but it is contemplated that a similar guide plate 48 may be arranged at the right-hand side of the conveyor path, if for any reason it were preferred to employ helices of left-hand pitch, or in fact to arrange such guide plates at both sides of the conveyor path if that were deemed desirable.

While one desirable embodiment of the invention has herein been disclosed by way of example, it is to be understood that the invention is broadly inclusive of any and all modifications falling within the scope of the appended claims.

I claim:

1. In a machine for labeling articles which are substantially elliptical in transverse section, and wherein the articles to be labeled are moved along a predetermined path past label-applying devices by a conveyor, and wherein articles are delivered into said path in contacting relation, means for spacing the articles and for orienting them, thereby accurately to align their major axes with the center line of said path before they enter the field of action of the label-applying devices, the article orienting means comprising like, rigid, helical elements located at opposite sides, respectively, of the article path, said helical elements being of the same pitch and turning in the same direction so as to advance the articles along said path, the article orienting helical elements being so shaped that, in co-operatively acting to turn an article, they make a four-point contact with the peripheral surface of the article, two of such points of contact being located at each side, respectively, of the vertical plane of the center line of the article path, and at equidistances from said plane, one pair of diagonally opposite points of contact being below the horizontal plane of the axes of the helices, while the other pair of diagonally opposite points of contact is above said plane, thereby neutralizing any tendency of the article to tip either forwardly or rearwardly, and guide means operative to prevent an article from tipping sidewise while moving toward the field of action of the label-applying devices.

2. Apparatus according to claim 1, wherein the means for preventing the article from tipping comprises a fixed part having a guiding edge which is accurately parallel to the center line of the conveyor path and which is so positioned as to contact the lateral surface of the article as the latter is moved along by the helical elements, said guide element also having a diagonal edge which converges toward and merges with said guiding edge and which, by contact with an article which has slightly tipped laterally, restores the article to vertical position before it contacts said guiding edge.

References Cited in the file of this patent

UNITED STATES PATENTS

| 2,571,036 | Heyne | Oct. 9, 1951 |
| 2,630,904 | Bozek | Mar. 10, 1953 |
| 2,886,200 | Thulke | May 12, 1959 |
| 2,890,787 | Carter | June 16, 1959 |
| 2,911,089 | Carter | Nov. 3, 1959 |